(12) United States Patent
Tomozawa et al.

(10) Patent No.: US 8,304,081 B2
(45) Date of Patent: Nov. 6, 2012

(54) PROCESS FOR MAKING RARE EARTH CONTAINING GLASS

(75) Inventors: Minoru Tomozawa, Troy, NY (US); Bungo Hatta, Shigaken (JP)

(73) Assignees: Rensselaer Polytechnic Institute, Troy, NY (US); Sekisui Chemical Co., Ltd., Shiga (JP)

( * ) Notice: Subject to any disclaimer, the term of this patent is extended or adjusted under 35 U.S.C. 154(b) by 669 days.

(21) Appl. No.: 12/446,132

(22) PCT Filed: Oct. 16, 2007

(86) PCT No.: PCT/US2007/081543
§ 371 (c)(1),
(2), (4) Date: Jun. 1, 2009

(87) PCT Pub. No.: WO2008/048974
PCT Pub. Date: Apr. 24, 2008

(65) Prior Publication Data
US 2010/0323204 A1    Dec. 23, 2010

Related U.S. Application Data

(60) Provisional application No. 60/852,173, filed on Oct. 17, 2006.

(51) Int. Cl.
*B32B 17/00*    (2006.01)
*C03B 25/00*    (2006.01)
*C03B 27/012*   (2006.01)

(52) U.S. Cl. .......... 428/426; 428/697; 428/702; 65/116; 65/117; 65/434

(58) Field of Classification Search .......... 428/426, 428/688, 689, 697, 702; 65/116, 117, 434
See application file for complete search history.

(56) References Cited

U.S. PATENT DOCUMENTS

| 4,530,909 A | 7/1985 | Makishima et al. |
| 5,084,881 A | 1/1992 | Farries et al. |
| 5,747,397 A | 5/1998 | McPherson et al. |

(Continued)

FOREIGN PATENT DOCUMENTS

JP     58002235     1/1983

(Continued)

OTHER PUBLICATIONS

International Search Report for PCT/US2007/081543 dated Jan. 10, 2008.

(Continued)

*Primary Examiner* — Jennifer McNeil
*Assistant Examiner* — Lauren Robinson
(74) *Attorney, Agent, or Firm* — Heslin Rothenberg Farley & Mesiti P.C.

(57) ABSTRACT

The invention relates to a process for making a $SiO_2$—$RE_xO_y$—$Al_2O_3$ glass comprising preparing a glass according to a conventional process wherein the conventional process comprises a step of heat treating a mixture of $SiO_2$, $RE_xO_y$, and $Al_2O_3$ at a temperature greater than the spinodal temperature for 0.1 to 10 hours wherein $RE_xO_y$ is a rare earth oxide and RE is a rare earth element chosen from Sc, Y, La, Ce, Pr, Nd, Pm, Sm, Eu, Gd, Tb, Dy, Ho, Er, Tm, Yb, Lu, and combinations thereof. The invention also relates to glasses prepared by the process and glass lasers, optical amplifiers and laminated glass that comprise the glass prepared by the process.

19 Claims, 14 Drawing Sheets

U.S. PATENT DOCUMENTS

| | | | |
|---|---|---|---|
| 5,798,306 A | 8/1998 | Dickinson | |
| 6,416,867 B1 | 7/2002 | Karpen | |
| 6,450,652 B1 | 9/2002 | Karpen | |
| 6,451,414 B1 | 9/2002 | Wheatley et al. | |
| 6,482,758 B1 | 11/2002 | Weber et al. | |
| 6,914,024 B2 * | 7/2005 | Anderson | 501/33 |
| 7,130,513 B2 | 10/2006 | Haruna et al. | |
| 2002/0012086 A1 | 1/2002 | Uchida et al. | |
| 2004/0105264 A1 | 6/2004 | Spero | |
| 2005/0026768 A1 | 2/2005 | Shimizu et al. | |
| 2005/0107240 A1 | 5/2005 | Uehara | |
| 2005/0272589 A1 | 12/2005 | Shimizu et al. | |
| 2007/0032366 A1 | 2/2007 | Kasuga et al. | |

FOREIGN PATENT DOCUMENTS

| | | |
|---|---|---|
| JP | 58002236 | 1/1983 |
| JP | 58060639 | 4/1983 |
| JP | 60239330 | 11/1985 |

OTHER PUBLICATIONS

Containerless Research, Inc., Glass Products Division, "Business Opportunity: Licensing New Glass Technology" Bulletin (May 27, 2005).

* cited by examiner

The numbers ref to mol %

Figure 7 shows the ternary immiscibility boundaries obtained at 1750 °C and 1600 °C.

PROCESS FOR MAKING RARE EARTH CONTAINING GLASS

CROSS REFERENCE TO RELATED APPLICATIONS

This application is a national phase entry under 35 USC §371 of PCT International Application PCT/US2007/081543, filed Oct. 16, 2007, and published under PCT Article 21(2) in English as WO 2008/048974 on Apr. 24, 2008. PCT/US2007/081543 claimed priority from U.S. Provisional Application No. 60/852,173 filed Oct. 17, 2006. Both are incorporated herein by reference in their entirety.

FIELD OF THE INVENTION

The invention relates to a process for making rare earth containing glass and a glass made from the process. More specifically it relates to a process for preparing a rare earth containing glass that includes a step of heat treatment at a temperature higher than the spinodal temperature. The invention also relations to the glass produced using this process.

BACKGROUND OF THE INVENTION

Oxide glasses doped with rare earth ions have been found to have many valuable applications. For example, they are useful in lasers, optical switches, optical amplifiers and have anti-glare applications. Vitreous $SiO_2$ glass is a good host for rare earth ions because of its high transparency, its low coefficient of thermal expansion, and its excellent chemical durability.

$SiO_2$ glass doped with rare earth ions has a light absorption property in the visible light range. Because of this absorption property, $SiO_2$ glass doped with rare earth ions can be used as a color filtering glass or a selective light filtering glass or, when the rare earth is Nd, a contrast enhancement glass for displays. $SiO_2$ glasses doped with $Nd^{3+}$ ions and $SiO_2$ glass doped with $Er^{3+}$ ions have found use as anti-glare glasses.

Existing rare earth doped glasses have encountered some problems due to the low solubility of rare earth ions in $SiO_2$ causing concentration quenching which lowers the optical efficiency of the glass. At higher percentages of rare earth ions, problems with phase separation are encountered due to the low solubility of rare earth ions in $SiO_2$. Phase separation lowers the transmittance of the glass because of the scattering of visible light. Concentration quenching is another problem associated with rare earth doped $SiO_2$ glasses. Concentration quenching of $SiO_2$ glass doped with rare earth ions has been reported to be due to the clustering of rare earth elements. In order to increase the solubility of rare earth ions in $SiO_2$ glass, $Al^{3+}$ ions are often co-doped. However, these glasses still suffer concentration quenching when the concentration of rare earth ions reaches useful levels. For example, a problem with the prior art $SiO_2$ glass doped with rare earth elements is that concentration quenching generally becomes significant when the amount of rare earth oxide exceeds 1 mol %.

Neodymium containing glasses are known to be useful in preventing glare and intense light. These glasses have found use in protecting against the temporary decline in eye sight caused by intense light, for example, from a car's headlights or sunlight coming through a windshield. This effect is due to neodymium's absorption of visible light which human eyes are sensitive to at around 580 nm.

The problems associated with rare earth glasses such as concentration quenching and low solubility of the rare earths leading to inhomogeneous distributions have limited the usefulness of these glasses.

SUMMARY OF THE INVENTION

The problems associated with rare earth glasses such as concentration quenching, low solubility of rare earth oxides and inhomogeneous distributions of the glass components are overcome by the invention. The invention provides a process for preparing rare earth containing $SiO_2$—$RE_xO_y$—$Al_2O_3$ glasses, where RE is a rare earth element and $RE_xO_y$ refers to a rare earth oxide. The subscripts x and y refer to the stoichiometric ratio of rare earth element to oxygen respectively. Most rare earth oxides that are useful in the invention have the stoichiometric ratio $RE_2O_3$. The process of the invention includes a step of treating the glass at a temperature higher than the spinodal temperature. The glass, or glasses, prepared by this method are homogeneous, clear, and have reduced concentration quenching.

In some embodiments, the invention provides a process for making a $SiO_2$—$RE_xO_y$—$Al_2O_3$ glass comprising preparing a glass according to a conventional process wherein the process includes heat treating at a temperature higher than the spinodal temperature. For example, $SiO_2$—$RE_xO_y$—$Al_2O_3$ glasses can be prepared by melting, a conventional process for making glass. Where a step of heat treating above the spinodal temperature is included, the process is within the scope of the present invention. A batch comprising $SiO_2$ powder, $RE_xO_y$ powder and $Al_2O_3$ oxide powder is mixed using an alumina mortar and pestle. Then the mixture is put in a crucible and melted for 0.1 to 10 hours at a temperature higher than the spinodal temperature under air. After this heat treating, it is preferable to quench the sample with water, liquid nitrogen, or other means known to persons skilled in the art, for the purpose of avoiding devitrification of the sample during the cooling process and maintaining the glass structure achieved at the heat treating temperature.

As used herein, "process of the invention" refers to a process of making rare earth element containing glass having the general component makeup of $SiO_2$—$RE_xO_y$—$Al_2O_3$ where the process includes heat treating above the spinodal temperature.

In some embodiments of the invention, the invention includes a glass made by a the process of the invention, i.e., a $SiO_2$—$RE_xO_y$—$Al_2O_3$ glass prepared by a conventional process but including a step of heat treating at a temperature greater than the spinodal temperature for 0.1 to 10 hours.

The RE in $RE_xO_y$ is a rare earth element chosen from Sc, Y, La, Ce, Pr, Nd, Pm, Sm, Eu, Gd, Tb, Dy, Ho, Er, Tm, Yb, Lu, and combinations thereof.

In some preferred embodiments of the invention RE is Nd.

In some embodiments of the invention, heat treating is carried out at a temperature from about 50° C. to about 600° C. greater than the spinodal temperature. In some embodiments of the invention, heat treating is carried out at a temperature from about 200° C. to about 600° C. greater than the spinodal temperature. In some embodiments of the invention, heat treating is carried out at a temperature from about 300° C. to about 600° C. greater than the spinodal temperature.

In some embodiments, the process of the invention provides a $SiO_2$—$RE_xO_y$—$Al_2O_3$ glass comprising, in terms of mole percent on an oxide basis, about 60 to about 98.9 mol % $SiO_2$, about 1 to about 35 mol % $RE_xO_y$, and about 0.1 to about 30 mol % $Al_2O_3$, wherein $RE_xO_y$ is a rare earth oxide.

The process of the invention provides homogeneous $SiO_2$—$RE_xO_y$—$Al_2O_3$ glass with decreased composition fluctuation. This decrease can be attributed to the composition fluctuation being reciprocally proportional to the temperature difference between the spinodal temperature and heat-treatment temperature. Where the $SiO_2$—$RE_xO_y$—$Al_2O_3$ glass is a $SiO_2$—$Nd_2O_3$—$Al_2O_3$ glass, Nd clustering, which can cause concentration quenching in laser glasses, is decreased, making the glasses prepared by the process of the invention especially well suited for glass lasers. Similar properties can be obtained with glasses made according to the process of the invention with any of the rare earth elements and all such glasses are within the scope of the invention.

In some embodiments of the invention, $RE_xO_y$ is present in the glass prepared by the process of the invention from about 1 to about 35 mol % on an oxide basis. In some embodiments of the invention, $RE_xO_y$ is present in the glass prepared by the process of the invention from about 5 to about 35 mol % on an oxide basis. In some embodiments of the invention $RE_xO_y$ is present in the glass prepared by the process of the invention from about 10 to about 35 mol % on an oxide basis. In other embodiments of the invention, $RE_xO_y$ is present in the glass prepared by the process of the invention from about 20 to about 35 mol %.

In some embodiments, the invention includes glass lasers that use glass prepared by the process of the invention. In some embodiments, the invention includes optical amplifiers made with glass prepared by the process of the invention. In some embodiments, the invention includes optical amplifiers made with glass prepared by the process of the invention. In some embodiments, when the rare earth element is Nd, the invention includes contrast enhancement glass prepared by the process of the invention.

In some embodiments of the invention, the invention provides a laminated glass comprising two or more sheets of glass and one or more interlayer film, wherein at least one of the sheets of glass is prepared by the process of the invention and comprises, on an oxide basis, about 60 to about 98.9 mol % $SiO_2$, about 1-to about 35 mol % $RE_xO_y$, and about 0.1-to about 30 mol % $Al_2O_3$.

In some embodiments of the invention, the invention comprises laminated glass having either $Nd_2O_3$, $Er_2O_3$ or combinations thereof as the rare earth oxide, $RE_xO_y$.

In some embodiments of the invention, the laminated glass provided by the invention has a transmittance of more than 40%. In some embodiments, the laminated glass provided by the invention has a transmittance of more than 60%. In some embodiments of the invention, the laminated glass has a DeBoer score less than 5. In addition to laminated glasses, single-pane window and double-pane window glass can be prepared using the process of the invention.

In some embodiments of the invention, the laminated glass of the invention has $RE_xO_y$ present in from about 1 to about 35 mol % on an oxide basis, in layers of the laminated glass comprising glass prepared by the process of the invention. In some embodiments of the invention, the laminated glass of the invention has $RE_xO_y$ present in, from about 10 to about 35 mol % on an oxide basis in layers of the laminated glass comprising glass prepared by the process of the invention. In some embodiments of the invention, the laminated glass of the invention has $RE_xO_y$ present in from about 20 to about 35 mol % on an oxide basis, in layers of the laminated glass comprising glass prepared by the process of the invention.

DETAILED DESCRIPTION OF THE INVENTION

Figure 1:
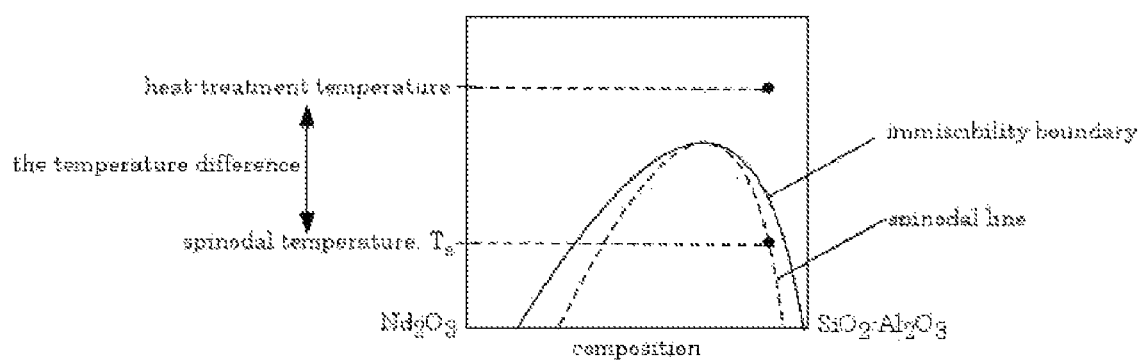
FIG. 1 is a schematic diagram indicating the temperature difference, T–Ts, for a given homogenous glass composition.

The invention relates to a process for preparing rare earth containing glasses and the glasses produced by this process. The glass of the invention is a $SiO_2$ glass which contains one or more rare earth element, RE, and aluminum, (hereinafter "the $SiO_2$—$RE_xO_y$—$Al_2O_3$ glass"). The terms the "$SiO_2$—$RE_xO_y$—$Al_2O_3$ glass" and the "glass of the invention" will be used interchangeably throughout this document and refer to the glass made by the process of the invention. The invention provides a process for preparing rare earth containing $SiO_2$—$RE_xO_y$—$Al_2O_3$ glasses, where RE is a rare earth element and $RE_xO_y$ refers to a rare earth oxide. The subscripts x and y refer to the stoichiometric ratio of rare earth element to oxygen respectively. Most rare earth oxides that are useful in the invention have the stoichiometric ratio $RE_2O_3$.

The invention overcomes some of the difficulties in the art such as concentration quenching of rare earth elements, clustering, and immiscibility of glass components. By using the process of the invention, which comprises heat treating at a temperature higher than the spinodal temperature in a process for preparing $SiO_2$—$RE_xO_y$—$Al_2O_3$ glass the composition fluctuation of homogeneous glass in a $SiO_2$—$RE_xO_y$—$Al_2O_3$ system can be decreased. The composition fluctuation is reciprocally proportional to the temperature difference between the spinodal temperature and heat-treatment temperature. When glass is prepared by the process of the invention, rare earth clustering, which can cause concentration quenching of rare earths, for example, in laser glasses, diminishes.

When the heat treatment is carried out will depend on the process used to make glass. Heat treatment, as used herein, will generally be part of the process of forming glass, including sintering, homogenization, or diffusion of each component, as is known in the art. For example, in conventional melting processes, heat treating at a temperature greater than the spinodal temperature will be carried out after the mixing of the raw materials. Regardless of the overall process used to make the glass, where heat treatment, heating, at a temperature higher than the spinodal temperature is included, the process falls within the scope of the invention.

The glass, or glasses, prepared by this method are homogeneous and clear, even where the mol % of rare earth oxide is greater than 1 mol %. As used herein, the mol % of the oxides are determined on an oxide basis. The unique properties of the glasses prepared by the process of the invention are believed to be conferred by the microscopic structure of the glass. Heat treating at temperatures above the spinodal temperature confers a microscopic structure on the glasses prepared by the process of the invention that results in the advantageous properties of the glass. The glasses prepared by the process of the invention have lower composition fluctuation and concentration quenching and are thus especially well suited to be used in optical glass lasers.

The immiscibility boundary can be calculated using the regular solution model for a binary system. See, (M. Tomozawa, p. 71 in *Treatise on Materials Science and Technology, Vol. 17, Glass II*, Edited by M. Tomozawa and R. H. Doremus, Academic Press, New York (1979)) The Gibbs free energy of mixing, $\Delta G$, is given by, $$\Delta G = \alpha_{12} x_1 x_2 + RT(x_1 \ln x_1 + x_2 \ln x_2) \quad (1)$$

where $x_1$ and $x_2$ are mole fraction of components 1 and 2 ($x_1+x_2=1$), respectively, R is the gas constant, and $$\alpha_{12} = NZ\left[W_{12} - \frac{1}{2}(W_{11} + W_{22})\right],$$

where Z is the coordination number, N is Avogadro's number and Ws are the binding energies and taken to be negative values. When $\alpha_{12}$ is positive, i.e. the average of $W_{11}$ and $W_{22}$ are more negative than $W_{12}$, the solution can have a miscibility gap. In the regular solution model [J. D. Fast, *Entropy*, McGraw Hill, New York (1962)], the second derivative of Gibbs free energy of mixing is given, using Eq. (1) and noting $x_2=1-x_1$, by $$\frac{\partial^2(\Delta G)}{\partial x_1^2} = -2\alpha + RT\left(\frac{1}{x_1} + \frac{1}{1-x_1}\right) \quad (2)$$

Here, $\alpha$ is same as $\alpha_{12}$ in Eq. (1). When Eq. (2) is set to zero, T becomes equal to the spinodal temperature, Ts. Using the resulting expression for Ts, Eq. (2) can be written as $$\frac{\partial^2 \Delta G}{\partial x_1^2} = R\left(\frac{1}{x_1} + \frac{1}{1-x_1}\right)(T - T_S) \quad (3)$$

In Eq. (3), the term, T−Ts, is the difference between the temperature under consideration and the spinodal temperature. Rare earth-doped silica glasses used for lasers and amplifiers should be homogenous glass without phase separation. These homogeneous glasses, which lie outside the immiscibility boundary, can also have composition fluctuation, $\overline{\Delta C^2}$ which is inversely proportional to $$\frac{\partial^2 \Delta G}{\partial x_1^2}$$

[I. L. Fabelinskii, *Molecular Scattering of Light*, Plenum Press, New York (1968)] as shown by $$\overline{\Delta C^2} \propto \frac{RT}{N\left(\frac{\partial^2 \Delta G}{\partial x_1^2}\right)} \quad (4)$$

By combining Eqs. (3) and (4), composition fluctuation can be expressed in terms of the difference between the temperature of interest and the spinodal temperature as shown below.

$$\overline{\Delta C^2} \propto \frac{T}{N\left(\frac{1}{x_1} + \frac{1}{1-x_1}\right)(T - T_S)} \quad (5)$$

This equation indicates that the larger the temperature difference between the temperature of interest, T, and the spinodal temperature, $T_s$, the lesser the composition fluctuation. FIG. 1 indicates the difference between Ts and T for a given homogeneous glass composition.

Figure 2:
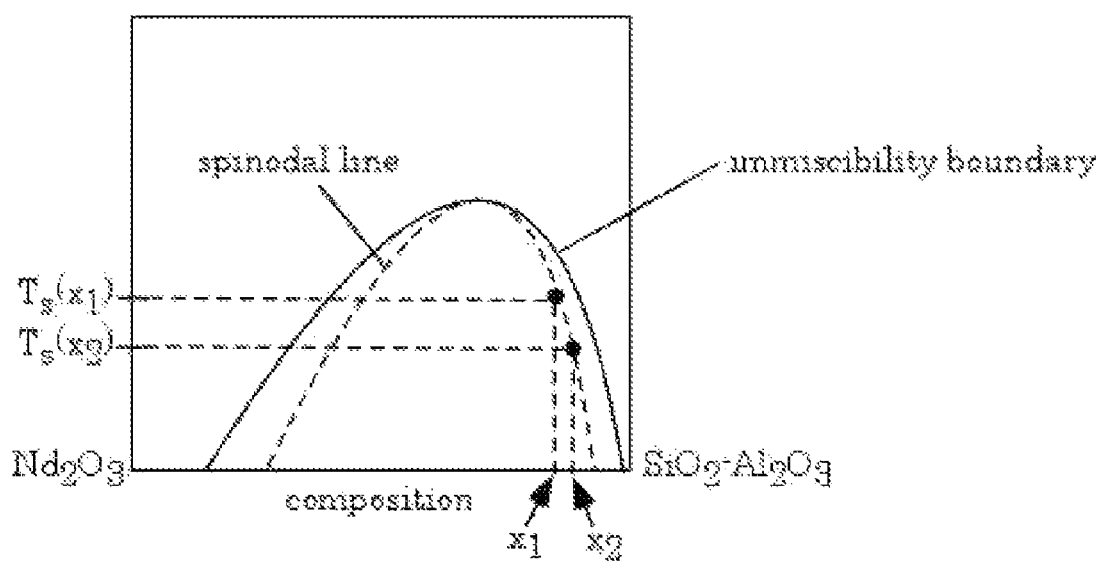
FIG. 2 is a schematic diagram indicating the relationship between the immiscibility boundary and the spinodal line at different glass compositions.

The spinodal line corresponds to the inflection point of $\Delta G$. Mathematically, it is the locus, where the secondary derivative of $\Delta G$ is equal to 0. As used herein, "spinodal temperature" means the temperature on the spinodal line for each composition as exemplified in FIG. 2 for Nd containing glass. Persons skilled in the art understand how to determine the spinodal temperature for different glass compositions.

The process of the present invention includes a step where the $SiO_2$—$RE_xO_y$—$Al_2O_3$ glass is heat-treated at a temperature higher than the spinodal temperature for the composition. This heat treatment should be done outside of the immiscibility range. As used herein, the "immiscibility range" is the region under the immiscibility boundary in FIG. 2. As used herein, "heat-treated" or "heat treating" means that at some point in the process used to prepare $SiO_2$—$RE_xO_y$—$Al_2O_3$ glass there is heating. The process of the invention comprises a step of heat treating above the spinodal temperature. Processes for making a $SiO_2$—$RE_xO_y$—$Al_2O_3$ glass where there is heat treating at a temperature above the spinodal temperature are within the scope of the invention.

In the process of the invention, it is preferred that the heat-treatment temperature is at least 50° C. higher than the spinodal temperature since if it is less than 50° C. higher than the spinodal temperature there may be significant clustering of rare earth elements. It is more preferred that the heat treatment temperature is at least 200° C. higher than the spinodal temperature. It is even more preferred that the heat treatment temperature is at least 300° C. higher than the spinodal temperature.

It is preferred that the heat-treatment temperature is not higher than 600° C. more than the spinodal temperature since if it is greater than 600° C. more than the spinodal temperature there may be difficulty controlling the final glass composition because of the vaporization of raw materials.

The glass of the present invention can be produced using processes for making glass that are known in the art. The term "conventional process" refers to processes known in the art for making glass. For example, the physical vapor deposition (PVD) method, the outside vapor deposition (OVD) method, the chemical vapor deposition (CVD) method, the modified chemical vapor deposition (MCVD) method, the vapor phase axial deposition (VAD) method, the plasma chemical vapor deposition method, the sol-gel method, float processes, and fusion processes are all conventional processes known in the art for making glass. See New Glass Handbook (Maruzen, Tokyo, 1991).

Simple melting is the most common conventional process for making glass. Any process for producing or synthesizing glass is included within the scope of the invention if heat treating above the spinodal temperature is carried out. These processes are all termed conventional processes herein to distinguish them from the process of the invention which differs in that a step of heating above the spinodal temperature is included. Where a conventional process includes heat-treating above the spinodal temperature, the conventional process is then within the scope of the invention. For example, simple melting to produce glass if it involves heating above the spinodal temperature is included within the scope of the invention.

The glass of the invention is a $SiO_2$ glass that contains a rare earth element, RE, and aluminum, hereinafter referred to either as the "$SiO_2$—$RE_xO_y$—$Al_2O_3$ glass" or "the glass of the invention." The glass of the invention (the $SiO_2$—$RE_xO_y$—$Al_2O_3$ glass) has the properties conferred on it by having been prepared by the process of the invention that includes a heat treating above the spinodal temperature.

In some embodiments of the invention, the glass of the invention comprises, in terms of mole % on an oxide basis, about 60 to about 98.9 mol % $SiO_2$, about 1 to about 35 mol % $RE_xO_y$, and about 0.1 to about 30 mol % $Al_2O_3$, wherein $RE_xO_y$ is rare earth oxide.

The upper limit of the amount of $SiO_2$ is about 98.9 mol % since at levels higher than about 98.9 mol % the optical properties might not be optimum for some applications. The lower limit of the amount of $SiO_2$ is about 60 mol % since where it is less than about 60 mol %, devitrification of the glass might occur.

It is preferred that the upper limit of mol % of $RE_xO_y$ in the glass is about 35 mol % since devitrification of the glass might occur at higher levels of $RE_xO_y$. It is preferred that the lower limit of the amount of $RE_xO_y$ is about 1 mol %. If it is less than 1 mol %, sufficient optical performance might not be obtained. It is more preferred that the mol % of $RE_xO_y$ in the glass is at least 5 mol %. It is even more preferred if the mole % of $RE_xO_y$ in the glass is at least 10 mol %. It is still more preferred if the mole % of $RE_xO_y$ in the glass is at least 20 mol %.

It is preferred that the upper limit of mol % of $Al_2O_3$ in the glass is about 30 mol % since devitrification of the glass can occur at higher levels. It is preferred that the lower limit of the mol % of $Al_2O_3$ in the glass is about 0.1 mol % since when the mol % of $Al_2O_3$ is less than 0.1 mol % phase separation of the glass can occur. It is more preferred that the lower limit of the mole % $Al_2O_3$ in the glass is 1 mol %, still more preferred if the lower limit of $Al_2O_3$ in the glass is about 5 mol %, and even still more preferred if the lower limit of $Al_2O_3$ in the glass is about 10 mol %.

Fumed silica, silica soot, arc silica, silicon tetrachloride, sol-gel derived silica, silicon alkoxide such as tetraethyl orthosilicate (TEOS), colloidal silica, silica sol, silica gel, silicon hydroxide, rare earth silicate, aluminosilicate, silicon-aluminum double oxide, or silicon can be used as the Si source to obtain the $SiO_2$—$RE_xO_y$—$Al_2O_3$ glass of the present invention.

Rare earth oxide, rare earth hydroxide, rare earth halide, rare earth nitrate, rare earth sulfate, rare earth carbonate, rare earth phosphate, rare earth oxycarbonate, rare earth carboxylate, rare earth oxalate, rare earth silicate, rare earth complex, rare earth acetylacetonate, rare earth alkoxide or aluminum-rare earth double alkoxide can be used as the rare earth source to obtain the $SiO_2$—$RE_xO_y$—$Al_2O_3$ glass of the invention.

Aluminum oxide, fumed alumina, aluminum hydroxide, sol-gel derived alumina, alumina synthesized by the sol-gel method, silicon-aluminum double oxide, aluminosilicate, aluminum oxychloride, aluminum halide, aluminum complex, aluminum alkoxide, aluminum-rare earth double aluminum alkoxide, aluminum rare-earth double oxide, or aluminum can be used as the Al source to obtain the $SiO_2$—$RE_xO_y$—$Al_2O_3$ glass of the invention.

Halogen gas such as $Cl_2$ gas or a halogen gas source such as $SOCl_2$ can be used for dehydration of the $SiO_2$—$RE_xO_y$—$Al_2O_3$ glass.

A small amount of clarifying agents such as $As_2O_5$ or $Sb_2O_5$ can be used in the glass of the invention.

The rare earth elements (RE) that can be included in the rare earth oxides of the glass of the invention include Sc, Y, La, Ce, Pr, Nd, Pm, Sm, Eu, Gd, Tb, Dy, Ho, Er, Tm, Yb, Lu, and combinations thereof.

The glass of the invention can include one or more rare earth element. For example, combinations such as $SiO_2$—$Nd_2O_3$—$Er_2O_3$—$Al_2O_3$ or $SiO_2$—$Er_2O_3$—$Yb_2O_3$—$Al_2O_3$ or $SiO_2$—$Er_2O_3$—$La_2O_3$—$Al_2O_3$ are included within the scope of the invention.

It is preferred that the glass of the invention does not include $Li_2O$, $Na_2O$, $K_2O$, $Rb_2O$, $Cs_2O$, BeO, MgO, CaO, SrO, BaO, $P_2O_5$, $B_2O_3$ because these oxides can worsen the heat stability and chemical durability of the glass.

In some embodiments, the glass of the present invention is a $SiO_2$ glass with neodymium and aluminum as required components. This glass will hereinafter be expressed as $SiO_2$—$Nd_2O_3$—$Al_2O_3$. Preferred embodiments of the $SiO_2$—$Nd_2O_3$—$Al_2O_3$ glass comprise in mol % on an oxide basis from about 30 to about 98.9 mol % $SiO_2$, from about 1 to about 30 mol % $Nd_2O_3$ and from about 0.1 to about 30 mol % $Al_2O_3$.

In embodiments of the invention where the glass is a $SiO_2$—$Nd_2O_3$—$Al_2O_3$ glass, the neodymium source can be neodymium oxide, neodymium hydroxide, neodymium halide, neodymium nitrate, neodymium sulfate, neodymium carbonate, neodymium phosphate, neodymium oxycarbonate, neodymium carboxylate, neodymium oxalate, neodymium silicate, neodymium complex, neodymium acetylacetonate, neodymium alkoxide or aluminum-neodymium double alkoxide.

In some embodiments, the glass of the invention finds application in reducing glare and light intensity to protect against short term loss of vision or discomfort caused by sensitivity to light. Neodymium and/or erbium containing glasses are especially useful in these applications. It is preferred that Neodymium, erbium, or combinations thereof are included in the glass of the invention for these embodiments.

$SiO_2$ glass doped with $Nd^{3+}$ ions absorbs light around 580 nm. At the same time, the relative luminous efficiency of the standard observer in photopic vision as defined by the Commission Internationale de l'Eclairage, CIE, has a distribution curve whose peak is at around 555 nm. $SiO_2$ glass doped with $Nd^{3+}$ ions provides an anti-glare effect for photopic vision because of its capacity to absorb light at around 580 nm, a region of comparatively high relative luminous efficiency.

$SiO_2$ glass doped with $Er^{3+}$ ions absorbs light around 520 nm. At the same time, the relative luminous efficiency of the standard observer in scotopic vision as defined by the Commission Internationale de l'Eclairage, CIE, has a distribution curve whose peak is at 507 nm. $SiO_2$ glass doped with $Er^{3+}$ ions provides an anti-glare effect in photopic vision because it absorbs light around 520 nm, a region of comparatively high relative luminous efficiency.

The glass of the present invention can take various forms or shapes such as a single-pane glass, a double-paned glass, and a laminated glass. In the case of a double-paned glass or a laminated glass, at lease one sheet of the glass must be the glass of the present invention. In the case of a laminated glass, conventional interlayer films such as poly(vinyl acetal) film, ethylene-vinylacetate copolymer film, and polyurethane film can be used. The preferred thicknesses for the glass of the invention are from about 0.5 mm to about 20 mm, however, the glass of the invention can also be used to prepare a thin film with a thickness of from about 0.1 um to about 1000 um. These thin films, for example, can be coated on conventional sheet glass.

The glass of the present invention can be molded into suitable shapes for various applications. For example, the glass can be used in glass lasers, optical amplifiers, fiber optics, color filtering glass and selective light filtering glass.

The glass of the invention can be coated on conventional glass, plastic films, plastic sheets and plastic plates, using methods such as the sol-gel method, the CVD method, the PVD method, and the like, which are known to persons skilled in the art.

By coating the glass of the present invention on conventional glass, plastic films, plastic sheets or plastic plates, these coated materials can be used as color filters and selective light filters. Such color filters or selective light filters can be used as materials for displays such as CRT displays, LCDs, plasma displays, EL displays, and FEDs. When the rare earth in the glass of the present invention is neodymium and/or erbium, the coated material can be used as an anti-glare material.

Conventional glass that can be used with the glass prepared by the present invention includes, for example, soda-lime glass, silica glass, borosilicate glass, aluminosilicate glass, phosphate glass, germinate glass, fluoride glass, chalcogenide glass, halide glass and oxynitride glass.

Plastic films, sheets or plates that can be used with the invention include, for example, acrylic resin, polycarbonate, polyethylene, polyester, polyethylene, terephthalate, polyacrylamide, polyacetal, polyamide, polyimide, polyurethane, poly(vinyl chloride), polyolefin, polystyrene, poly(vinyl alcohol), poly(vinyl acetal) and poly(vinyl butyral).

In some embodiments, the glass of the invention can be used for vehicles such as automobiles, airplanes, ships, trains and as glass for buildings. For these applications, the glass of the invention can be used, for example, as a selective light filtering glass. When the glass of the invention is prepared with the rare earth neodymium and/or erbium, the glass can be used as an anti-glare glass.

The glass of the invention can be in conventional forms such as single glazing glass, laminated glass, and sealed insulated glass as well as patterned glass, wired glass, and other variations understood by persons skilled in the art.

Where the glass of the invention is used as laminated glass, the lamination structure should include at least one sheet of the glass of the invention. For example, in some embodiments of the invention, the laminated glass can be comprised of two sheets of the glass of the present invention and an inter layer film. In some embodiments of the invention, a laminated glass can be comprised of one sheet of the glass of the invention, one sheet of conventional glass, and an interlayer film. Persons skilled in the art would understand that there are many other arrangements of laminated glass that include one or more layers or sheets of the glass of the invention and that these alternative embodiments of laminated glass are within the scope of the present invention.

In laminated glasses the conventional glass can be an inorganic glass, such as soda-lime glass, silica glass, borosilicate glass, aluminosilicate glass, phosphate glass, germinate glass, fluoride glass, chalcogenide glass, halide glass and oxynitride glass, or an organic glass, such as acrylic resin, polycarbonate, polyethylene, polyester, polyethylene, terephthalate, polyacrylamide, polyacetal, polyamide, polyimide, polyurethane, poly(vinyl chloride), polyolefin, polystyrene, poly(vinyl alcohol), poly(vinyl acetal), and poly(vinyl butyral).

The laminated glass can take on various useful structures in addition to conventional flat glass. In embodiments of the invention comprising laminated glass, it is preferred that the thickness of the glass layers used, i.e., the glass of the invention and conventional glass, should be between about 0.5 mm to 20 mm since glass of less than 0.5 mm can lack sufficient strength for some uses. In embodiments of the invention where transmittance of the laminated glass is important, it is preferred that the laminated glass has a thickness less than about 5 mm since when the laminated glass is thicker than about 5 mm, the transmittance of the laminated glass might be decreased.

In some embodiments of the invention, the laminated glass of the invention comprises an interlayer film comprised of a plasticized polyvinyl acetal film such as plasticized polyvinyl butyral film, ethylene vinyl acetate copolymer film, ethylene-acrylic copolymer film, polyurethane film, sulfur-containing polyurethane film, and the like.

In some embodiments of the invention, the interlayer can include an antioxidant, heat-stabilizers, dimension stabilizers, pigments, coloring agents, antistatic agents, surfactants, dispersing agents, chelating agents to trap free metal ions, absorbents, plasticizers, organic solvents, tackiness-reinforcing agents, crystal nucleators, crosslinking agents, flame retardants, adhesive property controlling reagents (such as silicon oil), alkaline metal salts, alkaline earth metal salts, silane coupling agents, and combinations thereof.

In some embodiments of the invention, the surface of the interlayer film can be treated physically or chemically. For example, the surface of the interlayer film can be treated using an emboss treatment, a plasma treatment or a corona discharge treatment. It is understood that other treatments and combinations of the treatments can be used in some embodiments of the invention.

In some embodiments of the invention, adhesion supporting agents, such as Si coupling agents, can be used to increase the bonding strength between the glass and interlayer film.

In some embodiments of the invention the glass and/or interlayer film includes UV-cutting materials, such as ZnO, CeO, $TiO_2$, and organic UV cutting agents. These UV cutting materials can reduce the danger of cataract or inflammation of the eyes caused by UV light.

In some embodiments of the invention, an IR cutting material, such as tin doped indium oxide, is coated on the glass to cut off IR light. In some embodiments, IR light is cut off by including an IR cutting material, such as tin doped indium oxide nano particles, in the interlayer film. Cutting off IR light can be useful, for example, to decrease the increase in temperature inside vehicles that use glass treated in this way.

When $SiO_2$—$RE_xO_y$—$Al_2O_3$ glasses of the invention are used in glass lasers, $Pr^{3+}$ ions, $Nd^{3+}$ ions, $Er^{3+}$ ions, $Tm^{3+}$ ions and $Yb^{3+}$ ions are preferred as rare earth dopants. $SiO_2$—$Pr_2O_3$—$Al_2O_3$ glass has laser emission wavelengths at around 1.3 µm, 0.635 µm, 0.6 µm, 0.52 µm and 0.49 µm. $SiO_2$—$Nd_2O_3$—$Al_2O_3$ glass has laser emission wavelengths at around 1.03-1.1 µm, 0.9-0.95 µm and 1.32-1.35 µm. $SiO_2$—$Er_2O_3$—$Al_2O_3$ glass has laser emission wavelengths at around 1.5-1.6 µm, 2.7 µm and 0.55 µm. $SiO_2$—$Tm_2O_3$—$Al_2O_3$ has laser emission wavelengths at around 1.7-2.1 µm, 1.45-1.53 µm, 0.48 µm and 0.8 µm. $SiO_2$—$Yb_2O_3$—$Al_2O_3$ glass has a laser emission wavelength at around 1.0-1.1 µm.

Glass lasers that incorporate glass made by the process of the invention are included within the scope of the invention. Persons skilled in the art understand how to make glass lasers using the glass of the invention. See Walter Koechner "Solid-State Laser Engineering" (5$^{th}$ Edition) (Spinger-Verlag, New York, 1999); "New Glass Handbook" (Maruzen, Japan, 1991).

Optical amplifiers that incorporate glass made by the process of the invention are included within the scope of the invention. Persons skilled in the art understand how to make optical amplifiers using the glass of the invention.

The present invention is further illustrated by the following non-limiting examples.

Example 1

Estimating the Spinodal Lines from the Critical Compositions at 1750° C. and 1600° C. for $SiO_2$—$Nd_2O_3$—$Al_2O_3$ Glass A $SiO_2$—$Nd_2O_3$—$Al_2O_3$ glass was prepared, in accordance with the process of the invention, by melting. Composition ranges of the glasses were $Nd_2O_3$ 2.5-40 mol %, $Al_2O_3$ 0-15 mol % with the balance being $SiO_2$. Batch materials used in glass melting were sol-gel-derived high purity silica powder from Nippon Kasei Chemical Co., Ltd. (MKC® silica PS400L), $Nd_2O_3$ powder from Sigma-Aldrich (99.9% purity) and reagent-grade $Al_2O_3$ powder from Fisher Scientific. The batch was mixed using an alumina mortar and pestle. Approximately 50 mg of the mixture was put in a 90% Pt-10% Rh boat (ca. 10 mm×10 mm×5 mm) and melted for 1 h at 1750° C. in air. The melted glass was quenched by putting it into water together with the boat. Similar glasses were heat-treated also at 1600° C. before water quenching. To prepare these samples, the glass was melted at 1750° C. for 1 h and then cooled down to 1600° C. in a furnace, and held for 1 h at 1600° C. and then quenched in water. The surfaces of samples were polished with a SiC polishing paper (600 grit) and then with $CeO_2$ particles. The polished samples were washed with alcohol, neutral detergent in water, alcohol again and finally with water in an ultrasonic cleaner.

Figure 3:
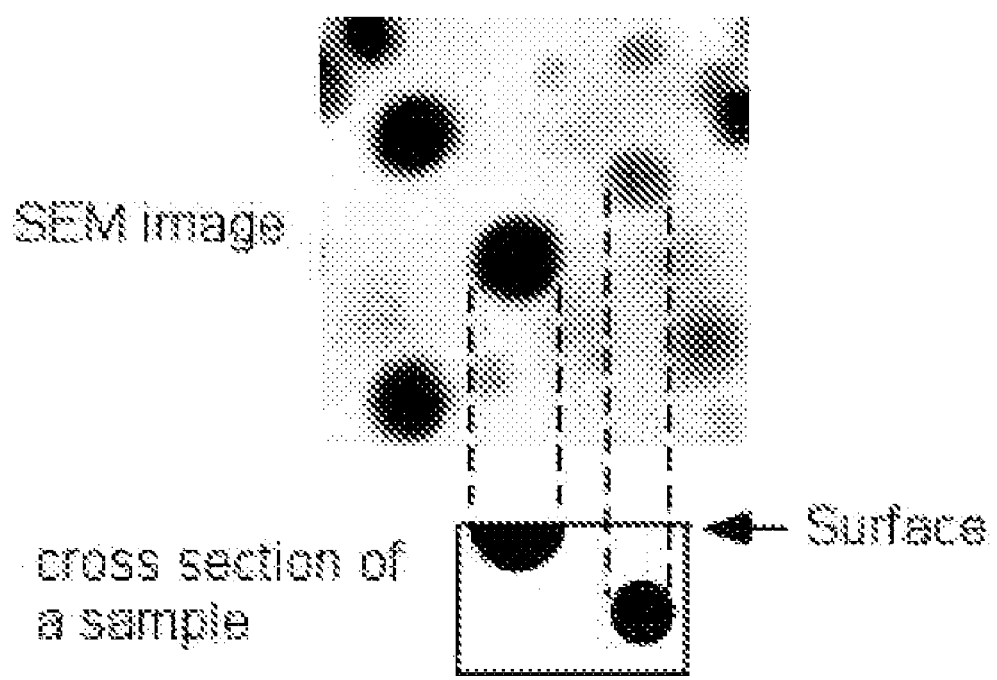
FIG. 3 shows a scanning electron microscopy (SEM) of a phase separated sample indicating a two phase structure.
Figure 4:
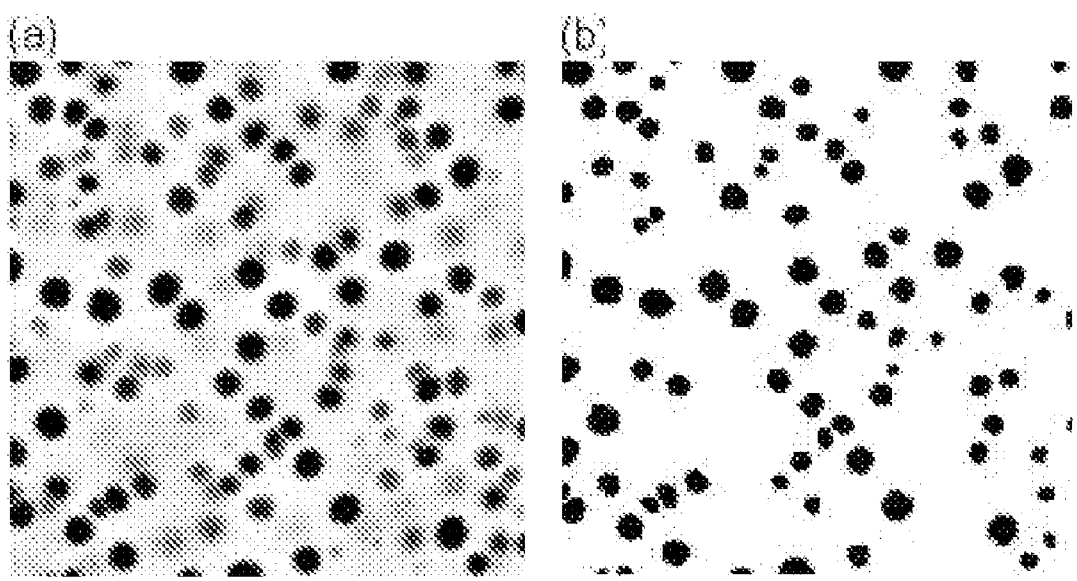
FIG. 4(a) shows an original SEM image of a phase separated sample and FIG. 4 (b) indicates the selected two phases considered to be on the sample surface.

To observe the microstructures of phase separation, scanning electron microscope (SEM) images of the polished surface were taken with a JSM-840 (JEOL) and at least three spots of the sample were examined. For identification of each phase composition of a phase-separated glass, elemental analyses were also carried out using the same SEM instrument. The probe diameter in this case was approximately 1 µm in diameter. For phase-separated samples, SEM images showed a two phase structure as shown in FIG. 3. Darker colored particles are considered to be on the sample surface whereas the light colored particles appear to be inside the sample. Volume fraction of separated phases were determined by first selecting only the particles on the surface as shown in FIGs. 4 (*a*) and (*b*) and evaluating the area fraction of the dark part and the white part as shown in FIG. 4 (*b*), using analySIS FIVE (Olympus). The tie lines of phase separation were estimated using the obtained volume fraction.

For selected samples, x-ray diffraction analyses (XRD) with a D5000 Diffractometer (Siemens) were made to confirm that the glass samples are amorphous. Electron microprobe analyses with a SX 100 (CAMECA) of a sample were made to see whether the nominal compositions are close to the real glass compositions. For this purpose, rhyolite glass was used as the $SiO_2$ standard, $Nd_2PO_4$ was used as the $Nd_2O_3$ standard, and kyanite was used as the $Al_2O_3$ standard. The spot size probed with an electron beam was about 5 µm in diameter, and thirteen data points were selected randomly.

Figure 5:
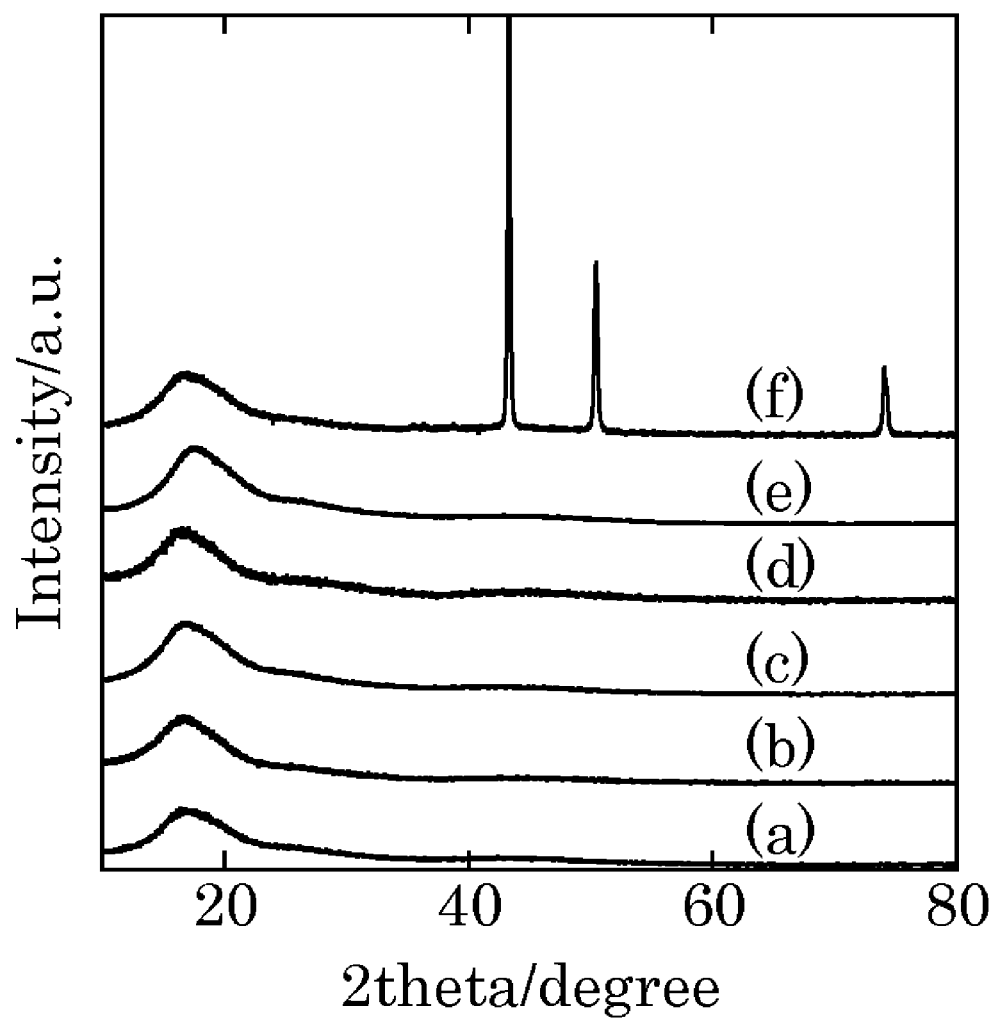
FIG. 5 shows the results of XRD measurements for selected $SiO_2$—$Nd_2O_3$—$Al_2O_3$ ternary glass powder samples, sample holder, and copper powder for reference.

FIG. 5 shows the results of XRD measurements for selected $SiO_2$—$Nd_2O_3$—$Al_2O_3$ ternary glass powder samples, sample holder, and copper powder for reference; (a) 92.5$SiO_2$-5$Nd_2O_3$-2.5$Al_2O_3$, (b) 90$SiO_2$-5$Nd_2O_3$-5$Al_2O_3$, (c) 70$SiO_2$-22.5$Nd_2O_3$-7.5$Al_2O_3$, (d) 68.7$SiO_2$-22.5$Nd_2O_3$-8.8$Al_2O_3$, (e) the sample holder used for the measurements, and (f) a similar quantity of copper powder. Since the sample quantities were small, some diffraction signal originates from the plastic sample holder employed (e). To make sure that a crystalline peak, if any, can be detected with the employed small quantity of the sample, a similar quantity of copper powder sample was measured (f). There was no crystalline peak observed in the prepared ternary glass samples while a peak was observed in the same quantity of copper powder, indicating that the sample quantity is adequate for peak detection.

Table A shows the result of electron microprobe analysis for 85 SiO2-7.5 $Nd_2O_3$-7.5 $Al_2O_3$ glass. The difference between nominal and analyzed compositions was 1.2~1.5 mol % for $SiO_2$ and $Nd_2O_3$ while it was 0.3 mol % for $Al_2O_3$. Table A. Nominal vs. analyzed glass composition using electron microprobe.

TABLE A

Figure 6:
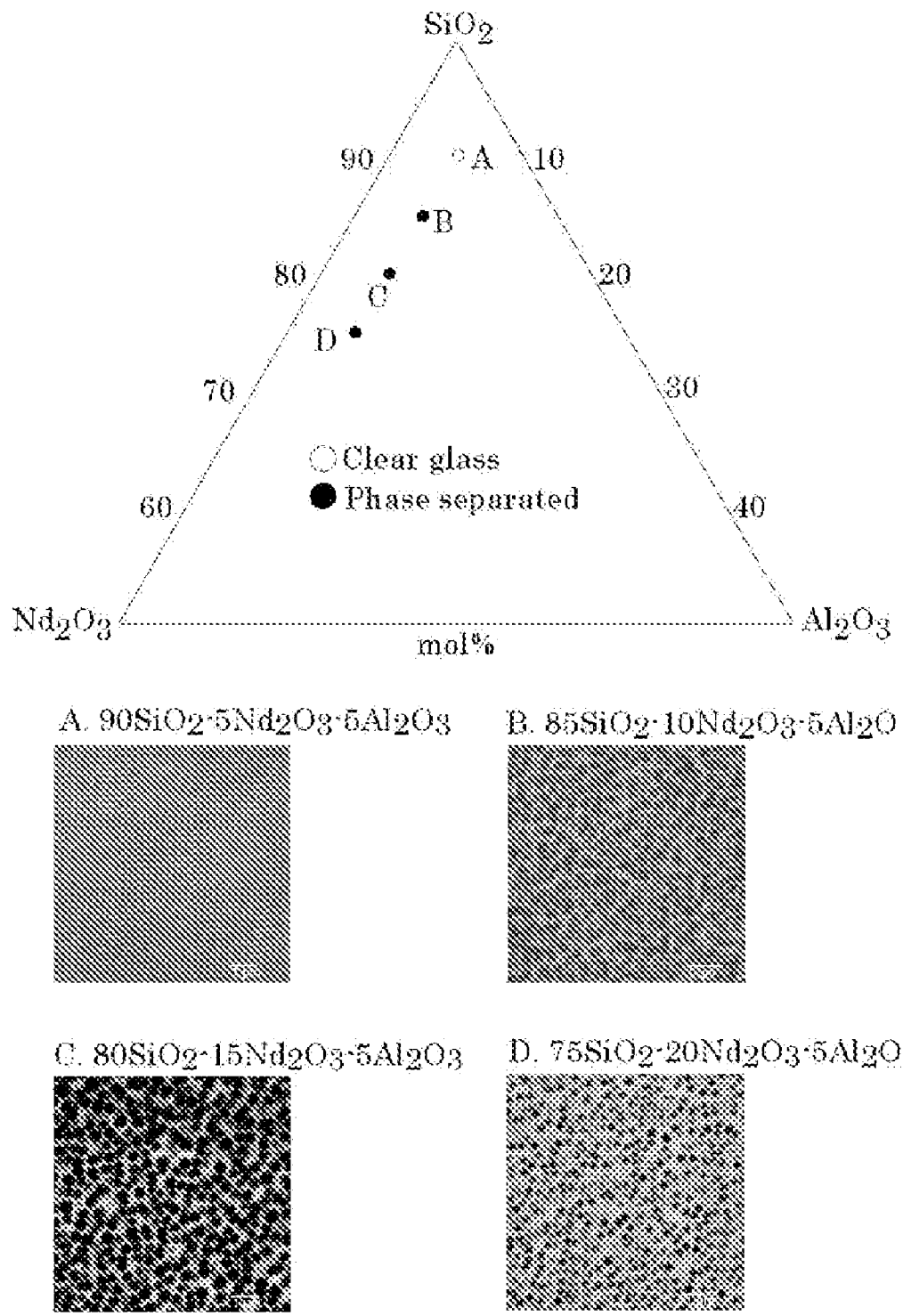
FIG. 6 shows SEM images of selected composition of $SiO_2$—$Nd_2O_3$—$Al_2O_3$ system glasses heat-treated at 1750° C. with a triangular composition diagram using the nominal glass compositions.

FIG. 6 shows SEM images of selected compositions of $SiO_2$—$Nd_2O_3$—$Al_2O_3$ system glasses heat-treated at 1750° C. together with the triangular composition diagram using the nominal glass compositions.

| | composition/mol % | | |
|---|---|---|---|
| | $SiO_2$ | $Nd_2O_3$ | $Al_2O_3$ |
| nominal | 85 | 7.5 | 7.5 |
| analyzed | 86.5 ± 0.1 | 6.3 ± 0.6 | 7.2 ± 0.3 |
| nominal − analyzed | −1.5 | +1.2 | +0.3 |

Example 2

Relation of the Immiscibility Boundary to the Volume Fraction

In order to relate the immiscibility boundary to the volume fraction evaluated, the immiscibility boundary has to be expressed in vol %. This was achieved by first converting mol % to wt % and then to vol %. FIG. 8 shows the immiscibility boundary in wt % which was obtained from the immiscibility boundary in mol % shown in FIG. 7 using the formula weight of each oxide. FIG. 9 shows the immiscibility boundary in vol % which was obtained using the density of each oxide. For $SiO_2$, the density of $SiO_2$ glass, 2.20 g/cm$^3$, was used. For the densities of $Nd_2O_3$ and $Al_2O_3$, the values of $Nd_2O_3$ and $Al_2O_3$ at room temperature, 7.24 g/cm$^3$ and 3.99 g/cm$^3$, respectively, were used.

The volume fractions of separated phases of selected glass samples are shown in Table B. The area fractions in the SEM images are equivalent to the volume fractions of the separated two phases in the sample. Here, as explained earlier in connection with FIG. 3, only dark black particles were counted for the area fraction as the $SiO_2$-rich phase on the cross section since the light black particles were considered to exist below the surface of the sample.

TABLE B

The area fractions of separated phases for selected samples.

| composition/mol % | heat treatment | The area fraction of SiO$_2$ rich phase | The area fraction of Nd$_2$O$_3$ rich phase |
|---|---|---|---|
| 75SiO$_2$—20Nd$_2$O$_3$—5Al$_2$O$_3$ | 1750° C.-1 h | 0.40 ± 0.01 | 0.60 ± 0.01 |
| 80SiO$_2$—15Nd$_2$O$_3$—5Al$_2$O$_3$ | 1750° C.-1 h | 0.63 ± 0.01 | 0.37 ± 0.01 |
| 72.8SiO$_2$—20Nd$_2$O$_3$—7.2Al$_2$O$_3$ | 1600° C.-1 h | 0.45 ± 0.03 | 0.55 ± 0.03 |

Figure 10:
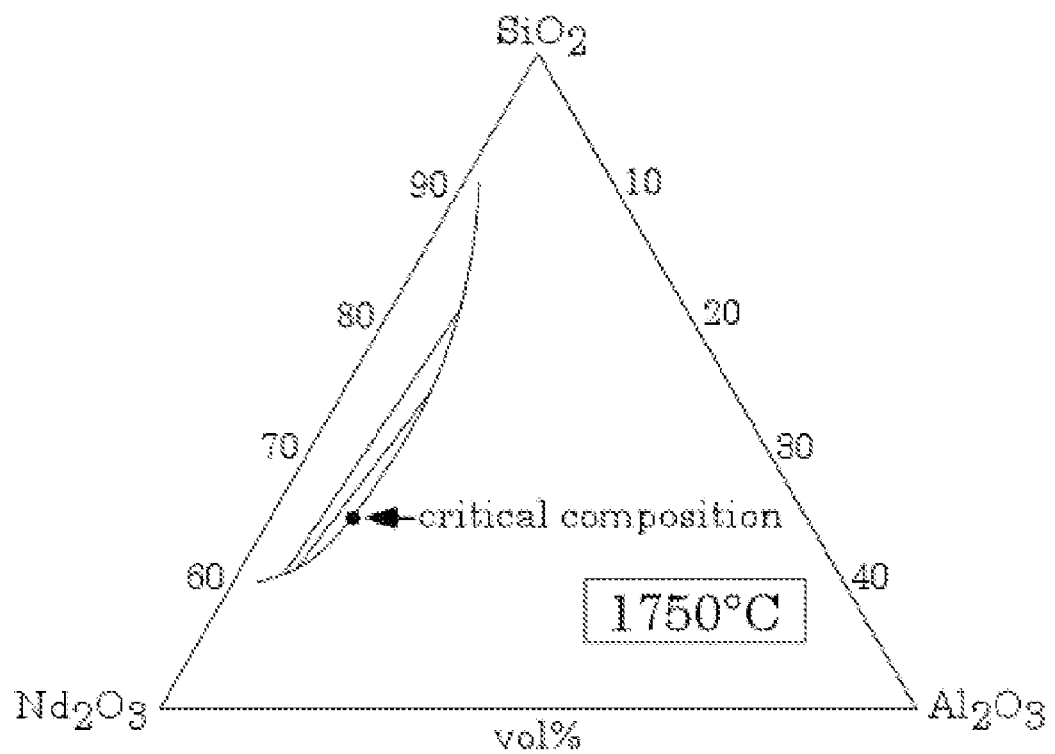
FIG. 10 shows the estimated tie lines and the immiscibility boundary at 1750° C.

Tie lines inside the immiscible range can be obtained by using the volume fraction determined above and the lever rule [P. W. Atkins, *Physical Chemistry*, third edition, Oxford University Press, Oxford (1986)]. FIG. 10 shows the tie lines obtained and the immiscibility boundary at 1750° C. Following the compositions corresponding to the centers of the tie lines, one can locate the critical composition, i.e., where the immiscibility boundary and the spinodal composition coincide [see M. Tomozawa, p. 71 in *Treatise on Materials Science and Technology, Vol. 17, Glass II*, Edited by M. Tomozawa and R. H. Doremus, Academic Press, New York (1979)]. The composition of 64.3SiO$_2$-30.0Nd$_2$O$_3$-5.7Al$_2$O$_3$ in vol % which corresponds to 73.1SiO$_2$-20.0Nd$_2$O$_3$-6.9Al$_2$O$_3$ in mol % was found to be the critical composition of this ternary system at 1750° C., as indicated in FIG. 10.

Figure 11:
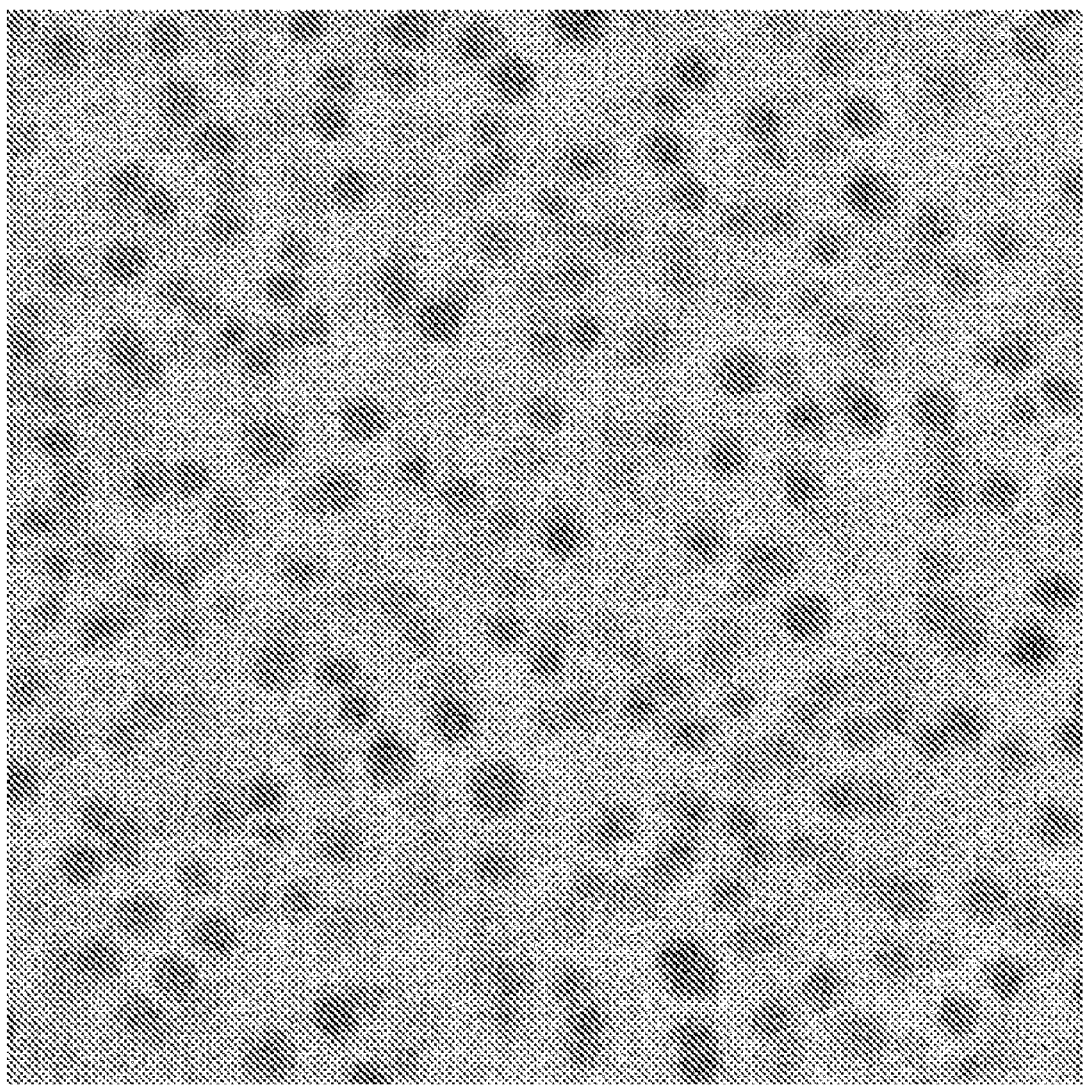
FIG. 11 shows a SEM image of a glass sample with an average composition of 72.8 $SiO_2$-20 $Nd_2O_3$-7.2 $Al_2O_3$ heat-treated at 1600° C. for 1 h and quenched.
Figure 12:
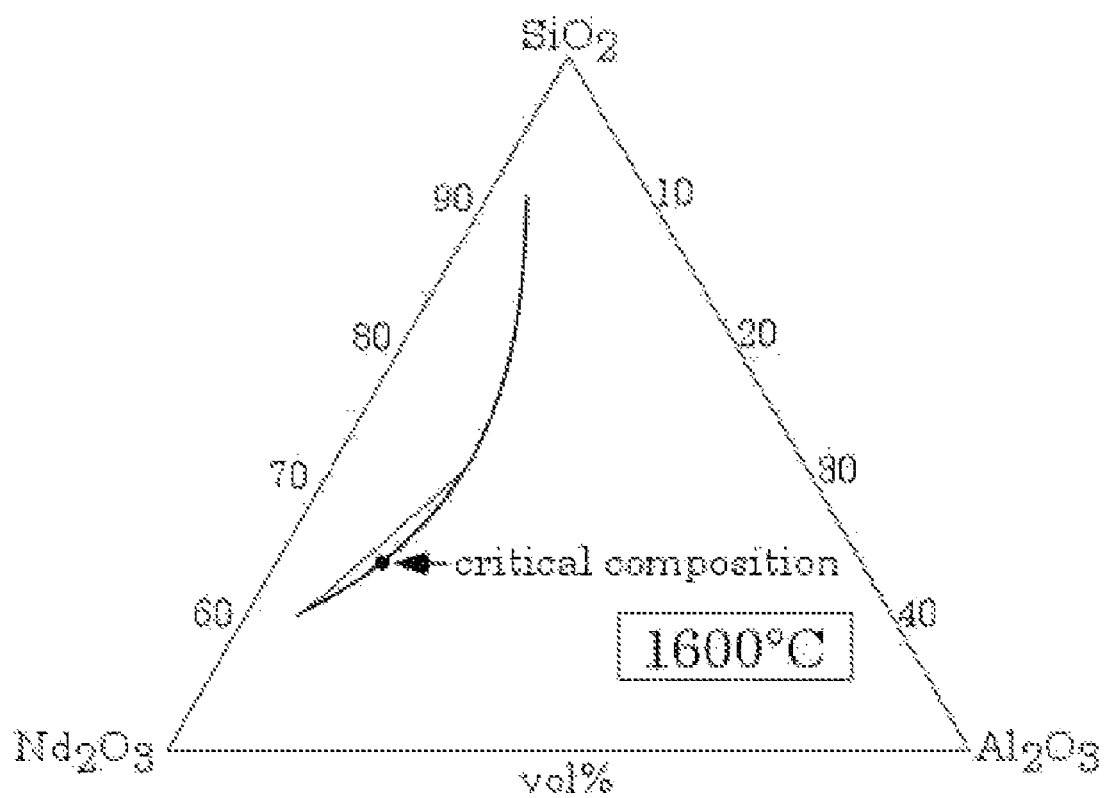
FIG. 12 shows the estimated tie lines and the immiscibility boundary at 1600° C.

The tie line and immiscibility boundary were also calculated for a 72.8 SiO$_2$-20 Nd$_2$O$_3$-7.2 Al$_2$O$_3$ glass sample heat-treated at 1600° C. FIG. 11 shows the SEM image. The area fraction of SiO$_2$-rich phase area was estimated to be 0.45±0.03 as shown in Table B. From these data, the tie line was drawn as shown in FIG. 12. Considering the relation between this tie line and the shape of the immiscibility range, a critical composition was estimated to be 62.5SiO$_2$-30.0Nd$_2$O$_3$-7.5Al$_2$O$_3$ in vol % (70.9SiO$_2$-20.0Nd$_2$O$_3$-9.1Al$_2$O$_3$ in mol %) at 1600° C., as indicated in FIG. 12.

This result means that the critical temperature of Nd$_2$O$_3$—SiO$_2$ binary system, which is about 2000° C. (see N. A. Toropov, Trans. Intern. Ceram. Congr., 7th, London (1960) p 435), decreases down to 1750° C. with 6.9 mol % of Al$_2$O$_3$ addition. Therefore, it can be concluded that the spinodal temperature decreases with Al$_2$O$_3$ addition.

Figure 7:
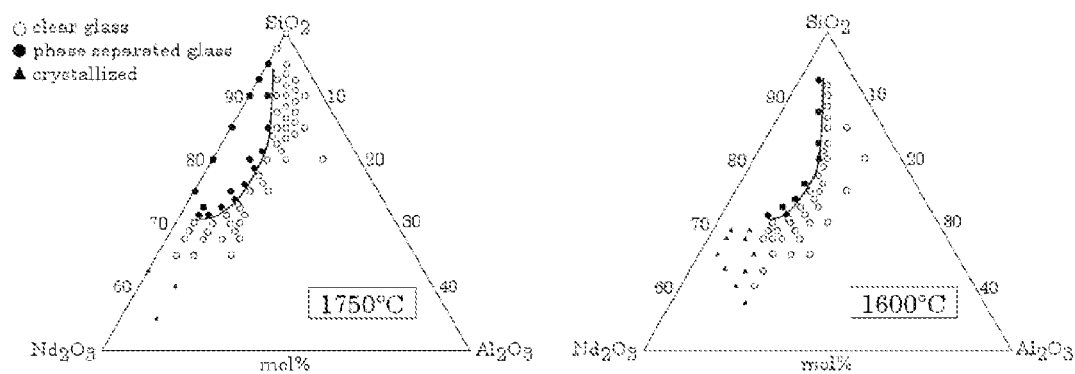
FIG. 7 shows ternary immiscibility boundaries obtained at 1750° C. and 1600° C. for the $SiO_2$—$Nd_2O_3$—$Al_2O_3$ system glass.
Figure 8:
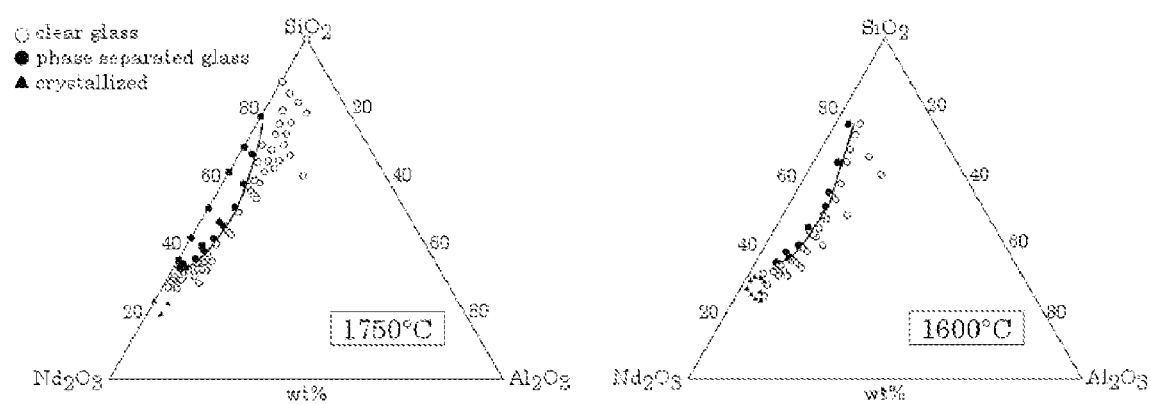
FIG. 8 shows the immiscibility boundaries in weight percent for the $SiO_2$—$Nd_2O_3$—$Al_2O_3$ system glass obtained from the immiscibility boundaries in mol % in FIG. 7.
Figure 9:
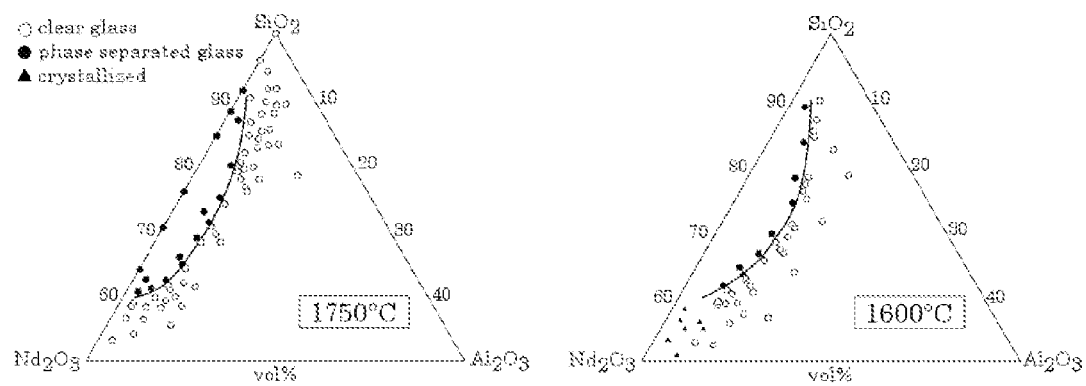
FIG. 9 shows the immiscibility boundary in vol % which was obtained using the density of each oxide.

A glass suitable for use in a glass laser or an optical amplifier can be obtained by heat-treating the composition in the clear glass range as shown in FIGS. 7, 8, and 9 at a temperature 50° C.-600° C. higher than the spinodal temperature. In this way, glasses with less composition fluctuation can be synthesized, see equation (5) and the concentration quenching is low.

Example 3

Phase Diagram at 1750° C.: SiO$_2$—Er$_2$O$_3$—Al$_2$O$_3$ Glass

SiO$_2$—Er$_2$O$_3$—Al$_2$O$_3$ glasses were prepared by melting. Composition ranges of the glasses were Nd$_2$O$_3$ 7.5-26.25 mol %, Al$_2$O$_3$ 5-15 mol % with the balance SiO$_2$. Batch materials used in glass melting were sol-gel-derived high purity silica powder from Nippon Kasei Chemical Co., Ltd. (MKC® silica PS400L), Er$_2$O$_3$ powder from Sigma-Aldrich (99.99% purity) and reagent-grade Al$_2$O$_3$ powder from Fisher Scientific. The batch was mixed using an alumina mortar and pestle. Approximately, 50 mg of the mixture was put in a 90% Pt-10% Rh boat (ca. 10 mm×10 mm×5 mm) and melted for 1 h at 1750° C. in air. The melted glass was quenched by putting it into water together with the boat.

Figure 13:
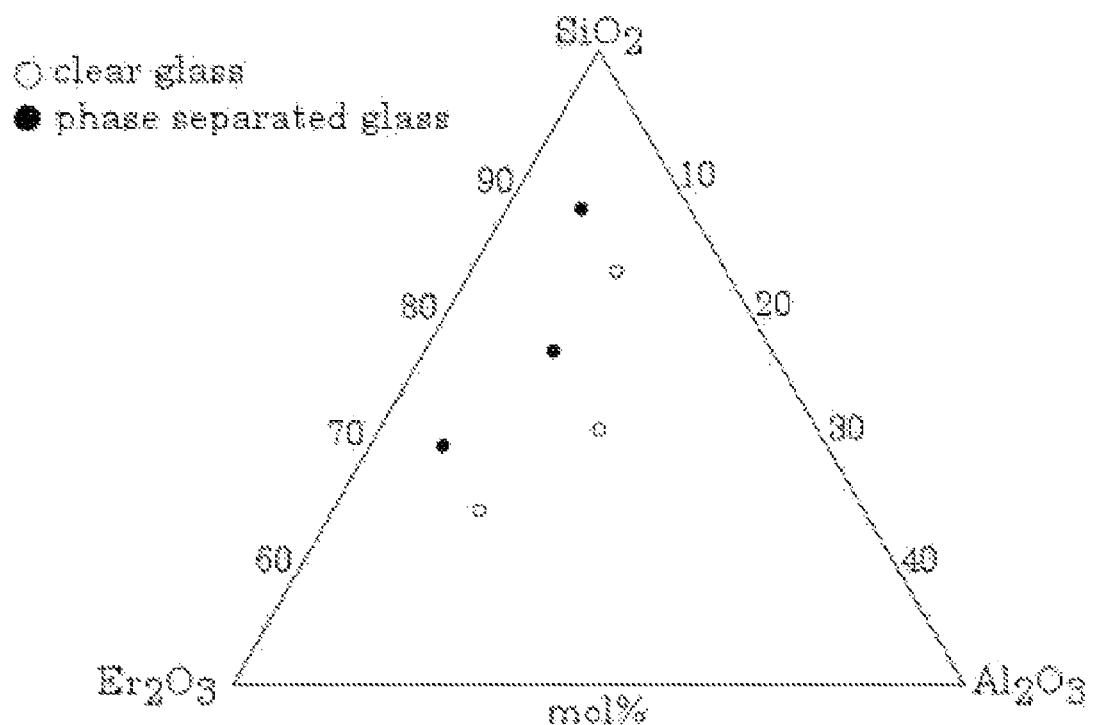
FIG. 13 shows a phase diagram at 1750° C. for an $SiO_2$—$Er_2O_3$—$Al_2O_3$ glass.

FIG. 13 shows the phase diagram determined by the experiment above. The same tendency with regard to immiscibility-miscibility behavior as the SiO$_2$—Nd$_2$O$_3$—Al$_2$O$_3$ glass system of Example 1 was obtained.

Example 4

Phase Diagram at 1750° C.: SiO$_2$—Yb$_2$O$_3$—Al$_2$O$_3$ Glass

SiO$_2$—Yb$_2$O$_3$—Al$_2$O$_3$ glasses were prepared by melting. Composition ranges of the glasses were Yb$_2$O$_3$ 7.5-26.25 mol %, Al$_2$O$_3$ 5-15 mol % with the balance SiO$_2$. Batch materials used in glass melting were sol-gel-derived high purity silica powder from Nippon Kasei Chemical Co., Ltd. (MKC® silica PS400L), Yb$_2$O$_3$ powder from Sigma-Aldrich (99.99% purity) and reagent-grade Al$_2$O$_3$ powder from Fisher Scientific. The batch was mixed using an alumina mortar and pestle. Approximately, 50 mg of the mixture was put in a 90% Pt-10% Rh boat (ca. 10 mm×10 mm×5 mm) and melted for 1 h at 1750° C. in air. The melted glass was quenched by putting it into water together with the boat.

Figure 14:
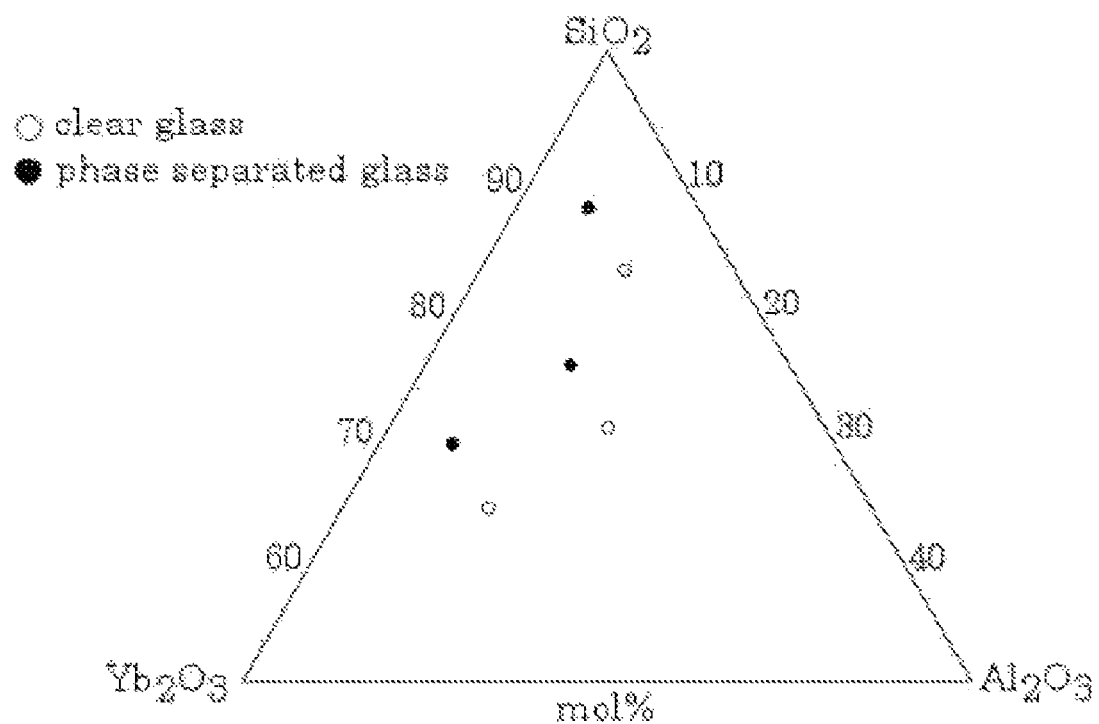
FIG. 14 shows a phase diagram at 1750° C. for an $SiO_2$—$Yb_2O_3$—$Al_2O_3$ glass.

FIG. 14 shows the phase diagram determined by this experiment. Similar results with regard to the immiscibility-miscibility behavior were obtained as in the SiO$_2$—Nd$_2$O$_3$—Al$_2$O$_3$ glass system of Example 1.

Example 5

Procedure for Making Laminated Glass

A flat glass having the composition of 65 mol % SiO$_2$, 30 mol % Nd$_2$O$_3$, and 5 mol % Al$_2$O$_3$ was prepared. 1 wt % of As$_2$O$_3$ and 1.5 wt % of Al(NO$_3$)9H$_2$O to 100 wt % of 65 mol % SiO$_2$, 30 mol % Nd$_2$O$_3$ were added as a refrigerant. Al(NO$_3$)9H$_2$O was dehydrated before use. The surface of the glass obtained was polished using a SiC polishing paper (600 grit) and CeO$_2$ powder. The size of the glass prepared was 50 mm×50 mm×2.5 mm.

The glass obtained was laminated with a sheet of soda lime glass via a plasticized polyvinyl butyral interlayer film. This laminated structure was heated at 100° C. for 20 minutes under a vacuum maintained by using a rubber bag. After this heat-treatment, the laminated structure was cooled to room temperature under vacuum. The laminated structure was then treated at 130° C. for 20 minutes under a pressure of 1.2 MPa using an autoclave.

The results for the laminated glass are shown in Table C as Sample A. Table D provides the De Boer score which was used to evaluate the anti glare performance of the laminated glass. Anti glare performance was evaluated by observing the sun outdoors on a clear day through the laminated glass for 5 seconds. The De Boer score was determined on an average of 10 people.

TABLE C

|  | Sample A | Sample B |
| --- | --- | --- |
| Appearance | Clear | Clear |
| Transparency | Very High | Very High |
| De Boer Score | 4.8 | 1.7 |

For comparison, a conventional laminated glass, which does not use the glass of the present invention, was prepared using two sheets of soda lime glass. The results of this laminated glass is shown as Sample B in Table C.

Table D describes the results of the evaluation in terms of the De Boer scores.

TABLE D

| Explanation of De Boer Scores | |
| --- | --- |
| Meaning | Rating |
| Just Noticeable | 9 |
|  | 8 |
| Satisfactory | 7 |
|  | 6 |
| Just Acceptable | 5 |
|  | 4 |
| Disturbing | 3 |
|  | 2 |
| Unbearable | 1 |

What is claimed is:

1. A process for making a $SiO_2$—$RE_xO_y$—$Al_2O_3$ glass comprising preparing a glass according to a conventional process wherein the conventional process comprises a step of heat treating a mixture of $SiO_2$, $RE_xO_y$, and $Al_2O_3$ at a temperature greater than the spinodal temperature for 0.1 to 10 hours, wherein $RE_xO_y$ is a rare earth oxide and RE is a rare earth element chosen from Sc, Y, La, Ce, Pr, Nd, Pm, Sm, Eu, Gd, Tb, Dy, Ho, Er, Tm, Yb, Lu, and combinations thereof, wherein said glass comprises, in terms of mol percent on an oxide basis, about 60 to about 98.9 mol % $SiO_2$, about 10 to about 35 mol % $Re_xO_y$, and about 0.1 to about 30 mol % $Al_2O_3$.

2. A process according to claim 1, wherein RE is Nd.

3. A process according to claim 1, further comprising a step of quenching.

4. A process according to claim 3, wherein the step of quenching comprises quenching with water or liquid nitrogen.

5. A process according to claim 1, wherein $RE_xO_y$ is present in from about 20 to about 35 mol % on an oxide basis.

6. A process according to claim 1, wherein the heat treating takes place at a temperature from about 50° C. to about 600° C. greater than the spinodal temperature.

7. A process according to claim 1, wherein the heat treating takes place at a temperature from about 200° C. to about 600° C. greater than the spinodal temperature.

8. A process according to claim 1, wherein the heat treating takes place at a temperature from about 300° C. to about 600° C. greater than the spinodal temperature.

9. A $SiO_2$—$RE_xO_y$—$Al_2O_3$ glass prepared by preparing a glass according to a conventional process wherein the conventional process comprises a step of heat treating a mixture of $SiO_2$, $RE_xO_y$, and $Al_2O_3$ at a temperature greater than the spinodal temperature for 0.1 to 10 hours, wherein $RE_xO_y$ is a rare earth oxide and RE is a rare earth element chosen from Sc, Y, La, Ce, Pr, Nd, Pm, Sm, Eu, Gd, Tb, Dy, Ho, Er, Tm, Yb, Lu, and combinations thereof, wherein said glass comprises, in terms of mol percent on an oxide basis, about 60 to about 98.9 mol % $SiO_2$, about 10 to about 35 mol % $RE_xO_y$, and about 0.1 to about 30 mol % $Al_2O_3$.

10. A $SiO_2$—$RE_xO_y$—$Al_2O_3$ glass according to claim 9, wherein $RE_xO_y$ is present in from about 20 to about 35 mol % on an oxide basis.

11. A laminated glass according to claim 10, wherein the transmittance of the laminated glass is more than 40%.

12. A laminated glass according to claim 10, wherein the transmittance of the laminated glass is more than 60%.

13. A laminated glass according to claim 10, wherein the DeBoer score is less than 5.

14. A $SiO_2$—$RE_xO_y$—$Al_2O_3$ glass according to claim 9, wherein Re is Nd.

15. A glass laser comprising the $SiO_2$—$RE_xO_y$—$Al_2O_3$ glass according to claim 9.

16. An optical amplifier comprising the $SiO_2$—$RE_xO_y$—$Al_2O_3$ glass according to claim 9.

17. A laminated glass comprising two or more sheets of glass and one or more interlayer film, wherein at least one of the sheets of glass is a $SiO_2$—$RE_xO_y$—$Al_2O_3$ glass according to claim 9.

18. A laminated glass according to claim 17, wherein $RE_xO_y$ is chosen from $Nd_2O_3$, $Er_2O_3$ and combinations thereof.

19. A laminated glass according to claim 9, wherein $RE_xO_y$ is present in from about 10 to about 35 mol %.

* * * * *